April 18, 1967 E. R. LEWIS, SR 3,314,630
FISHING KITE
Filed Feb. 15, 1966
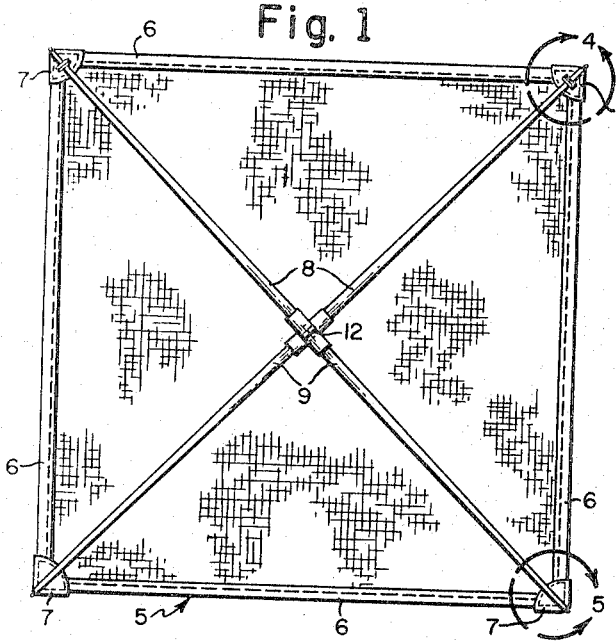
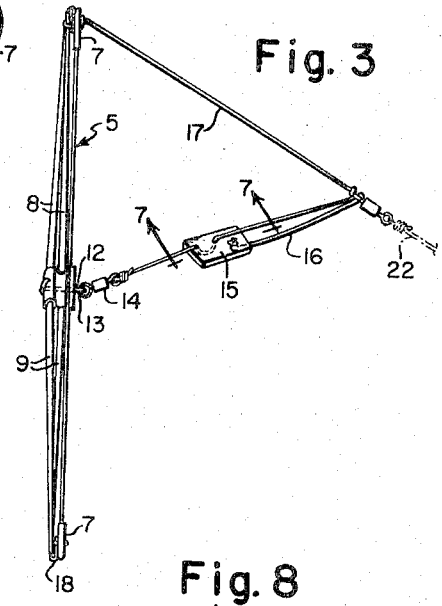
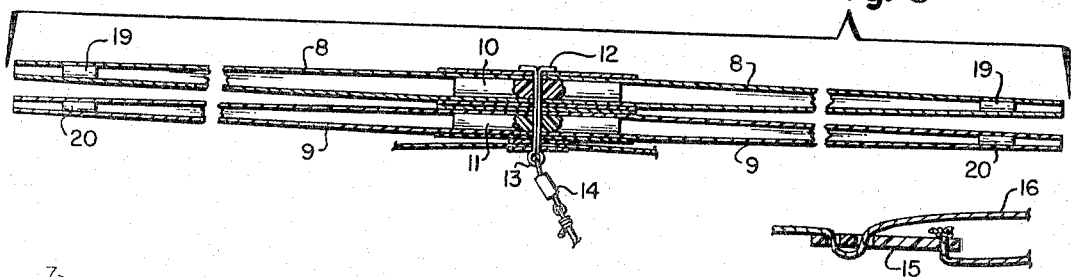
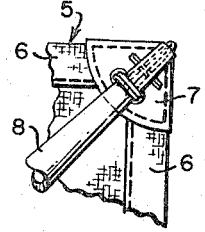
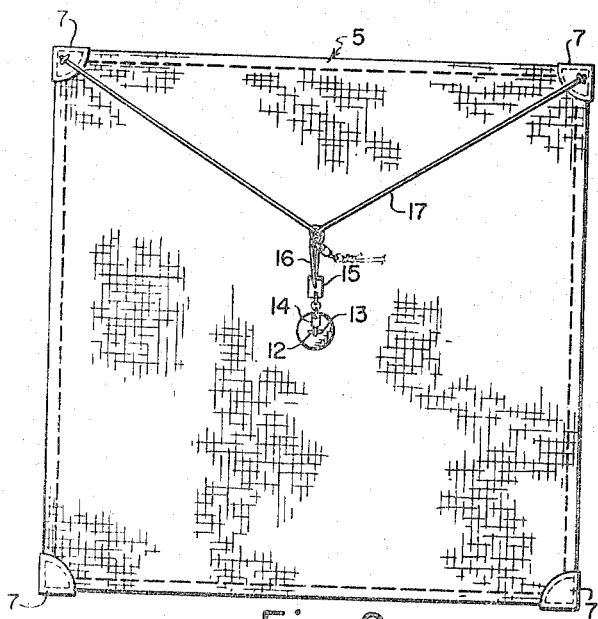
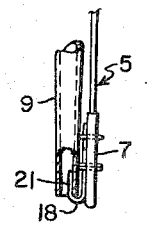
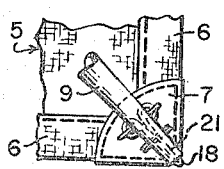
INVENTOR.
EDGAR R. LEWIS SR.
BY
ATTORNEY

United States Patent Office 3,314,630
Patented Apr. 18, 1967

3,314,630
FISHING KITE
Edgar R. Lewis, Sr., 6690 SW. 98th St.,
Miami, Fla. 33156
Filed Feb. 15, 1966, Ser. No. 527,440
4 Claims. (Cl. 244—153)

This invention relates to a fishing kite whereby to float over the water and support a bait at the surface of the water and with the kite being held above the water by normal air currents.

The kite comprises a square fabric cover that is expanded by triangular rods, having fitment into the corners of the kite and with means connected to two adjacent corners of the kite to constitute a connecting means for a fishing line or the like and with the fishing line being connected to a pivotal point of the rods by adjustable means.

In the drawings:

FIGURE 1 is a top plan view of an assembled kite constructed in accordance with the invention, FIGURE 2 is a bottom plan view of the kite in assembled form showing a bridle that is connected to a pivotal point of the expandable type rods, FIGURE 3 is an edge view of the structure illustrated in FIGURE 1, FIGURE 4 is an enlarged view of one corner of the kite showing the mounting means for the cross or expansion rods, FIGURE 5 is a view similar to FIGURE 4, but taken upon the opposite side of the kite, FIGURE 6 is a fragmentary sectional view of one corner of the kite, FIGURE 7 is a fragmentary sectional view through an adjustable bridle, connected with the kite and taken substantially on line 7—7 of FIGURE 3, and FIGURE 8 is a sectional view taken through the collapsed rods for supporting the kite in an operative position.

Referring specifically to the drawings, there has been illustrated particularly in FIGURES 1 and 2, a generally square fabric flexible kite 5, formed of any desirable material and having its edges hemmed, as indicated at 6. The kite 5, as illustrated is square in shape and its corners are reinforced by corner tabs 7 that are stitched or otherwise connected to the fabric of the kite.

Adapted to have connection to the opposite corners of the kite, are reinforcing plastic tubes 8 and 9. The tubes 8 and 9 are hollow tubular members, tapering from their central portion to the point where they connect to the corners of the kite. The tubes 8 and 9 are connected together by cylindrical plugs 10 and 11 into the open inner ends of the tubes 8 and 9 and are frictionally held therein and whereby to constitute a pivotal point for the tubes 8 and 9, by a cotter pin 12, that passes through apertures of the plugs 10 and 11 and with the cotter pin having an open cylindrical head 13 and whereby the tubes 8 and 9 are pivotally supported together to swing to and from a collapsed position and to also constitute the spreading means for the kite 5. The head 13 of the cotter pin 12 is connected to a swivel 14 that is connected to an adjustable toggle 15, in a bridle 16.

Each of the adjacent upper corner tabs 7 is connected to a bridle 17, that has connection to the bridle 16 and with each of the opposite corners 7 being provided with hooks 18, that have hooked engagement into the open ends of the tubes 8 and 9 whereby the kite is effectively connected at the ends of the tubes 8 and 9 to spread the kite 5 into a relatively taut position. The tubes 8 and 9 adjacent their outer open ends are provided with plugs 19 and 20 and whereby the tubes 8 and 9, with the plugs 10 and 11 are sealed against the entry of air or water. The ends of the tubes 8 and 9 are connected to the tabs 7 by wire loops 21 and so that the kite may be collapsed by swinging the tubes 8 and 9 upon the pivot 12, collapsing the kite 5 whereby the kite may be rolled into a relatively small elongated package.

In the use of the device, the kite is spread, as indicated in FIGURES 1 and 2 and the ends of the tubes 8 and 9 are connected to the tabs 7 by the wires 21. The pivotal member 12 fixes the tubes 8 and 9 together and the swivel 14 of the bridle 16 is connected thereto and projects from the central swivel point outwardly for connection to the bridle lines 17. The bridle lines 17 and 16 are then connected to a fishing line 22, upon which the fishing bait is connected, to float upon the surface of the water by the action of the kite, floating thereover.

It will be apparent from the foregoing that the fishing kite of this invention has provided a novel means for fishing from relatively small boats and may be fed outwardly from the boat and floats over the water by the draft of normally prevailing winds. The kite may also be employed to hold a small signal light or a radio antennae and is capable of folding into a slender package by unhooking lower corners and the kite is adjustable as to height by the center bridle. The entire device may be folded into a relatively small package for carrying or storage.

It is to be understood that the invention is not limited to the precise construction shown, but that changes are contemplated as readily fall within the spirit of the invention as shall be determined by the scope of the subjoined claims.

I claim:

1. A fishing kite of the character described including a generally square section of fabric, the fabric upon four sides having a hem, the kite being collapsible and held in an extended floatable condition by a pair of crossed tubular rods, the rods at their central section being pivotally connected together so that the kite may be collapsed, means upon each end of the rods that have hooking engagement with corner tabs for each corner of the kite, the rods being pivotally connected together at their central portion by a cotter pin that passes through apertures and with the cotter pin upon one end being provided with an opened eye and bridle means connected to adjacent corners of the kite for subsequent connection to a fishing line.

2. The structure according to claim 1 wherein the rods are formed of portions of tapered tubular plastic construction, tapering toward outer ends and with the inner ends of the portions constituting the larger ends and with the larger end of each portion being coupled together by a frictional plug, the outer or small ends of the rods being closed by frictionally engaged plugs so that the rods for their major length are hollow and floatable.

3. The structure according to claim 1 wherein the tubular rods are in normal expanding position with respect to the kite to maintain the kite in a fully expanded position and with the rods at their pivotal point being collapsible so that they shift to parallel positions for collapsing the kite, the rods at each end being provided with hooks that are connected to the corner tabs to maintain the rods against displacement from the kite, the bridle being connected to two adjacent tabs and also connected to the eye of the cotter pin and with the connecting means for the bridle having a swivel that is connected to the eye of the cotter pin and also to the bridle and slidably adjustable means for the connection of the bridle to the eye of the cotter pin for controlling the angularity of the bridle.

4. The structure according to claim 2 wherein the rods at their outer ends are fixed to the several tabs by hooks that extend through the tabs and that overlie the terminal ends of the rods and means associated with the bridle, comprising a swivel that is connected to a fishing line.

No references cited.

MILTON BUCHLER, *Primary Examiner.*

P. E. SAUBERER, *Assistant Examiner.*